(12) United States Patent
Suyama et al.

(10) Patent No.: US 11,319,021 B2
(45) Date of Patent: May 3, 2022

(54) BICYCLE REAR DERAILLEUR

(71) Applicant: Shimano Inc., Osaka (JP)

(72) Inventors: Shouta Suyama, Osaka (JP); Atsuhiro Emura, Osaka (JP); Kenta Nakamura, Osaka (JP)

(73) Assignee: Shimano Inc., Osaka (JP)

( * ) Notice: Subject to any disclaimer, the term of this patent is extended or adjusted under 35 U.S.C. 154(b) by 422 days.

(21) Appl. No.: 15/684,606

(22) Filed: Aug. 23, 2017

(65) Prior Publication Data

US 2019/0061877 A1 Feb. 28, 2019

(51) Int. Cl.
| | |
|---|---|
| *B62M 9/1242* | (2010.01) |
| *B62M 9/1248* | (2010.01) |
| *B62M 9/126* | (2010.01) |
| *B62M 9/127* | (2010.01) |
| *B62M 25/02* | (2006.01) |
| *B62M 9/125* | (2010.01) |

(52) U.S. Cl.
CPC .......... *B62M 9/1242* (2013.01); *B62M 9/125* (2013.01); *B62M 9/126* (2013.01); *B62M 9/127* (2013.01); *B62M 9/1248* (2013.01); *B62M 25/02* (2013.01)

(58) Field of Classification Search
CPC .... B62M 9/1242; B62M 9/125; B62M 9/126; B62M 9/127; B62M 9/1248
See application file for complete search history.

(56) References Cited

U.S. PATENT DOCUMENTS

| | | | | |
|---|---|---|---|---|
| 3,748,916 A | * | 7/1973 | Morse .................... | B62M 9/126 474/82 |
| 3,803,933 A | * | 4/1974 | Huret ................... | B62M 9/1242 474/82 |
| 3,973,447 A | * | 8/1976 | Nagano ................ | B62M 9/1242 474/82 |
| 3,994,167 A | * | 11/1976 | Juy ........................ | B62M 9/126 474/82 |
| 4,362,523 A | | 12/1982 | Huret | |
| 4,406,643 A | * | 9/1983 | Shimano ................ | B62M 9/126 474/80 |

(Continued)

FOREIGN PATENT DOCUMENTS

CN 103707995 A 4/2014

*Primary Examiner* — Michael R Mansen
*Assistant Examiner* — Juan J Campos, Jr.
(74) *Attorney, Agent, or Firm* — Global IP Counselors, LLP (57) ABSTRACT

A bicycle rear derailleur includes a base member, a chain guide, a movable member and a first link member. The base member is configured to be mounted to a bicycle frame at a frame mounting axis. The chain guide includes a first pulley rotatably arranged around a first pulley axis in a first pulley plane. The movable member pivotally supports the chain guide about a pivot axis. The first link member moves the chain guide between first and second lateral positions. The first lateral position is closer to a bicycle center plane. The first pulley plane intersects the first link member in a state where the chain guide is located at the second lateral position. The frame mounting axis is spaced from the pivot axis by a distance equal to or larger than eighty-nine millimeters when the chain guide is at the first lateral position.

14 Claims, 7 Drawing Sheets

(56) References Cited

U.S. PATENT DOCUMENTS

| | | | | |
|---|---|---|---|---|
| 4,443,208 A * | 4/1984 | Kozakae | B62M 9/1248 | 474/80 |
| 4,469,479 A * | 9/1984 | Ozaki | B62M 9/1244 | 474/80 |
| 4,500,302 A * | 2/1985 | Crepin | B62M 9/1242 | 474/82 |
| 4,610,644 A * | 9/1986 | Nagano | B62M 9/126 | 474/82 |
| 4,690,663 A * | 9/1987 | Nagano | B62M 9/125 | 474/80 |
| 4,699,605 A * | 10/1987 | Jona | B62M 9/1242 | 474/82 |
| 4,731,045 A * | 3/1988 | Nagano | B62M 9/125 | 474/78 |
| 4,734,084 A * | 3/1988 | Nagano | B62M 9/125 | 474/80 |
| 4,801,287 A * | 1/1989 | Romano | B62M 9/124 | 474/82 |
| 4,850,940 A * | 7/1989 | Nagano | B62M 9/1244 | 474/80 |
| 4,878,884 A * | 11/1989 | Romano | B62M 9/1242 | 474/82 |
| 4,895,553 A * | 1/1990 | Nagano | B62M 9/126 | 474/80 |
| 5,102,372 A * | 4/1992 | Patterson | B62K 23/04 | 474/80 |
| 5,163,881 A * | 11/1992 | Chattin | B62M 9/123 | 474/78 |
| 5,197,927 A * | 3/1993 | Patterson | B62K 23/04 | 474/80 |
| 5,397,273 A * | 3/1995 | Ando | B62M 9/1248 | 474/82 |
| 5,421,786 A * | 6/1995 | Ando | B62K 19/30 | 474/78 |
| 5,466,194 A * | 11/1995 | Steinberg | B62M 9/126 | 474/80 |
| 5,518,456 A * | 5/1996 | Kojima | B62M 9/1242 | 474/77 |
| 5,533,937 A * | 7/1996 | Patterson | B62M 9/125 | 474/80 |
| 5,597,366 A * | 1/1997 | Ozaki | B62M 9/1244 | 474/82 |
| 5,624,335 A * | 4/1997 | Ando | B62M 9/1242 | 474/80 |
| 5,836,844 A * | 11/1998 | Yoshida | B62M 9/125 | 474/80 |
| 5,961,409 A * | 10/1999 | Ando | B62M 9/1244 | 474/80 |
| 6,793,598 B1 * | 9/2004 | Savard | B62M 9/1248 | 474/80 |
| 2004/0106482 A1 * | 6/2004 | Nagano | B62M 9/1242 | 474/82 |
| 2004/0110586 A1 * | 6/2004 | Shahana | B62J 23/00 | 474/80 |
| 2005/0120822 A1 * | 6/2005 | Shahana | B62M 9/127 | 74/502.6 |
| 2005/0192141 A1 * | 9/2005 | Onogi | B62M 9/1242 | 474/82 |
| 2005/0218623 A1 * | 10/2005 | Oishi | B62M 9/1242 | 280/200 |
| 2006/0240920 A1 * | 10/2006 | Urabe | B62M 9/126 | 474/80 |
| 2007/0021248 A1 * | 1/2007 | Shahana | B62M 9/125 | 474/83 |
| 2007/0026985 A1 * | 2/2007 | Yamaguchi | B62M 9/1242 | 474/82 |
| 2007/0173360 A1 * | 7/2007 | Shahana | B62M 9/1242 | 474/82 |
| 2007/0191159 A1 * | 8/2007 | Fukuda | B62M 9/1242 | 474/82 |
| 2007/0202977 A1 * | 8/2007 | Watarai | B62M 9/1242 | 474/82 |
| 2007/0202978 A1 * | 8/2007 | Yamaguchi | B62M 9/126 | 474/82 |
| 2007/0207886 A1 * | 9/2007 | Shahana | B62M 9/1242 | 474/80 |
| 2008/0026890 A1 * | 1/2008 | Oseto | B62M 9/1242 | 474/82 |
| 2008/0026891 A1 * | 1/2008 | Oseto | B62M 9/1242 | 474/82 |
| 2008/0064545 A1 * | 3/2008 | Yamaguchi | B62M 9/126 | 474/82 |
| 2008/0081716 A1 * | 4/2008 | Watarai | B62M 9/125 | 474/80 |
| 2008/0103000 A1 | 5/2008 | Watarai et al. | | |
| 2008/0125259 A1 * | 5/2008 | Kunisawa | B62M 9/121 | 474/82 |
| 2008/0153639 A1 * | 6/2008 | Tan | B62M 9/1244 | 474/80 |
| 2008/0194363 A1 * | 8/2008 | Kunisawa | B62M 9/126 | 474/82 |
| 2009/0054183 A1 * | 2/2009 | Takachi | B62M 9/121 | 474/80 |
| 2009/0062045 A1 * | 3/2009 | Kunisawa | B62M 9/126 | 474/82 |
| 2009/0098963 A1 * | 4/2009 | Watarai | B62K 23/06 | 474/80 |
| 2009/0137354 A1 * | 5/2009 | Oseto | B62M 9/126 | 474/82 |
| 2009/0163310 A1 * | 6/2009 | Yamaguchi | B62M 9/125 | 474/82 |
| 2009/0247334 A1 * | 10/2009 | Takachi | B62M 9/1248 | 474/82 |
| 2009/0275429 A1 * | 11/2009 | Deguchi | B62M 9/125 | 474/80 |
| 2009/0291789 A1 * | 11/2009 | Ishikawa | B62M 9/1248 | 474/82 |
| 2010/0004079 A1 * | 1/2010 | Watarai | B62M 9/125 | 474/80 |
| 2010/0093472 A1 * | 4/2010 | Oseto | B62M 9/126 | 474/80 |
| 2010/0184545 A1 * | 7/2010 | Takachi | B62M 9/1242 | 474/80 |
| 2011/0224035 A1 * | 9/2011 | Wehage | B62M 9/1242 | 474/80 |
| 2011/0224036 A1 * | 9/2011 | Bohm | B62M 9/126 | 474/80 |
| 2012/0083371 A1 * | 4/2012 | Yamaguchi | B62M 9/126 | 474/80 |
| 2012/0083372 A1 * | 4/2012 | Yamaguchi | B62M 9/126 | 474/80 |
| 2013/0079184 A1 * | 3/2013 | Yamaguchi | B62M 9/1248 | 474/80 |
| 2013/0203532 A1 * | 8/2013 | Jordan | B62M 9/1248 | 474/82 |
| 2013/0288834 A1 * | 10/2013 | Yamaguchi | B62M 9/126 | 474/80 |
| 2013/0303317 A1 * | 11/2013 | Yamaguchi | B62M 9/126 | 474/80 |
| 2014/0018199 A1 * | 1/2014 | Shahana | B62M 9/121 | 474/82 |
| 2014/0128191 A1 * | 5/2014 | Bohm | B62M 9/126 | 474/82 |
| 2014/0162818 A1 * | 6/2014 | Yamaguchi | F16H 61/68 | 474/80 |
| 2014/0243130 A1 | 8/2014 | Pasqua et al. | | |
| 2014/0371013 A1 * | 12/2014 | Yamaguchi | B62M 9/1244 | 474/122 |
| 2015/0031483 A1 * | 1/2015 | Yamaguchi | B62M 9/1242 | 474/80 |
| 2015/0072817 A1 * | 3/2015 | Yamaguchi | F16H 7/1227 | 474/113 |
| 2016/0046352 A1 * | 2/2016 | Shipman | B62M 9/126 | 474/80 |
| 2016/0176478 A1 * | 6/2016 | Chang | B62M 9/121 | 474/69 |

(56) References Cited

U.S. PATENT DOCUMENTS

2016/0304161 A1* 10/2016 Shirai .................. B62M 9/16
2017/0113759 A1* 4/2017 Watarai ................ B62M 9/122

* cited by examiner

BICYCLE REAR DERAILLEUR

BACKGROUND

Field of the Invention

This invention generally relates to a bicycle rear derailleur. More specifically, the present invention relates to a bicycle rear derailleur that is mounted to a bicycle frame.

Background Information

Generally, a bicycle rear derailleur includes a base member and a chain guide connected to the base member by one or more links. Bicycle rear derailleurs are sometimes mounted to a bicycle frame in either one of two conventional designs. In particular, a bicycle rear derailleur can be mounted to a bicycle frame directly (a direct mount design) via a mounting bolt. Typically, a direct mount derailleur will include a single mounting axis. A direct mount rear derailleur can only be mounted on direct-mount compatible frames that include an extended portion that protrudes rearward from the bicycle frame. The direct mount rear derailleur is mounted onto the extended portion of the bicycle frame. Alternatively, a non-direct mount bicycle rear derailleur can be mounted to the frame via a bracket axle unit and a mounting bolt. The non-direct mount rear derailleur utilizing a bracket axle unit includes two B-axes that are mounting axes.

SUMMARY

Generally, the present disclosure is directed to various features of a bicycle rear derailleur having a single mounting axis.

In view of the state of the known technology and in accordance with a first aspect of the present disclosure, a bicycle rear derailleur is provided that comprises a base member, a chain guide, a movable member and a first link member. The base member is configured to be mounted to a bicycle frame of a bicycle at a frame mounting axis. The chain guide includes a first pulley rotatably arranged around a first pulley axis in a first pulley plane. The movable member pivotally supports the chain guide about a pivot axis. The first link member is movably coupled between the base member and the movable member to laterally move the chain guide relative to the base member between a first lateral position and a second lateral position. The first lateral position is closer to a bicycle center plane of the bicycle frame than the second lateral position in a state where the bicycle rear derailleur is mounted to the bicycle frame. The first pulley plane intersects the first link member in a state where the chain guide is located at the second lateral position. The frame mounting axis is spaced from the pivot axis by a derailleur linear distance that is equal to or larger than eighty-nine millimeters in a state where the chain guide is positioned at the first lateral position.

With the bicycle rear derailleur according to the first aspect, it is possible for the rear derailleur to fit to a wide range bicycle rear sprocket assembly that has a largest sprocket of relatively larger size. Additionally, with this arrangement, the rear derailleur protrudes less from the bicycle frame because the first pulley plane intersects the first link member while the chain guide is located at the second lateral position. Therefore, possibility of collision between the rear derailleur and an obstacle is relatively low.

In accordance with a second aspect of the present invention, the bicycle rear derailleur according to the first aspect is configured so that the movable member includes a resistance applying mechanism applying resistance to a rotational movement of the chain guide.

With the bicycle rear derailleur according to the second aspect, the bicycle rear derailleur is more stable.

In accordance with a third aspect of the present invention, a bicycle rear derailleur is provided that comprises a base member, a chain guide, a movable member and a first link member. The base member is configured to be mounted to a bicycle frame of a bicycle at a single frame mounting axis such that a posture of the bicycle rear derailleur with respect to the bicycle frame is adjustable about the single frame mounting axis. The single frame mounting axis is spaced from a hub axis of the bicycle by a frame linear distance that is equal to or smaller than forty-two millimeters. The chain guide includes a first pulley rotatably arranged around a first pulley axis in a first pulley plane. The movable member pivotally supports the chain guide about a pivot axis. The movable member includes a resistance applying mechanism applying resistance to a rotational movement of the chain guide. The first link member is movably coupled between the base member and the movable member to laterally move the chain guide relative to the base member between a first lateral position and a second lateral position. The first lateral position is closer to a bicycle center plane of the bicycle frame than the second lateral position in a state where the bicycle rear derailleur is mounted to the bicycle frame. The first pulley plane intersects the first link member in a state where the chain guide is located at the second lateral position. The single frame mounting axis is spaced from the pivot axis by a derailleur linear distance that is equal to or larger than seventy-eight millimeters in a state where the chain guide is positioned at the first lateral position.

With the bicycle rear derailleur according to the third aspect, it is possible for the bicycle rear derailleur to fit to a wide range bicycle rear sprocket assembly. Additionally, with this arrangement, the rear derailleur protrudes less from the bicycle frame because the first pulley plane intersects the first link member while the chain guide is located at the second lateral position. Therefore, possibility of collision between the rear derailleur and an obstacle is relatively low. Additionally, the bicycle rear derailleur is more stable.

In accordance with a fourth aspect of the present invention, a bicycle rear derailleur is provided as comprising a base member, a chain guide, a movable member and a first link member. The base member is configured to be mounted to a bicycle frame of a bicycle at a frame mounting axis. The frame mounting axis is spaced from a hub axis of the bicycle by a frame linear distance that is equal to or smaller than forty-two millimeters. The chain guide includes a first pulley rotatably arranged around a first pulley axis in a first pulley plane. The movable member pivotally supports the chain guide about a pivot axis. The movable member includes a resistance applying mechanism applying resistance to a rotational movement of the chain guide. The first link member is movably coupled between the base member and the movable member to laterally move the chain guide relative to the base member between a first lateral position and a second lateral position. The first lateral position is closer to a bicycle center plane of the bicycle frame than the second lateral position in a state where the bicycle rear derailleur is mounted to the bicycle frame. The first link member is pivotally coupled to the base member at a first link axis. The frame mounting axis is disposed at the base member without another frame mounting axis between the frame mounting axis and the first link axis. The first pulley plane intersects the first link member in a state where the chain guide is located at the second lateral position. The frame mounting axis is spaced from the pivot axis by a derailleur linear distance that is equal to or larger than seventy-eight millimeters in a state where the chain guide is positioned at the first lateral position.

With the bicycle rear derailleur according to the fourth aspect, it is possible for the bicycle rear derailleur to fit to a wide range bicycle rear sprocket assembly. Additionally, with this arrangement, the rear derailleur protrudes less from the bicycle frame because the first pulley plane intersects the first link member while the chain guide is located at the second lateral position. Therefore, possibility of collision between the rear derailleur and an obstacle is relatively low. Additionally, the bicycle rear derailleur is more stable.

In accordance with a fifth aspect of the present invention, the bicycle rear derailleur according to any of the third and fourth aspects is configured so that the frame linear distance is equal to or larger than twenty millimeters.

With the bicycle rear derailleur according to the fifth aspect, it is possible for the bicycle rear derailleur to fit to a wide range bicycle rear sprocket assembly. Additionally, the rear derailleur protrudes less from the bicycle frame because the first pulley plane intersects the first link member while the chain guide is located at the second lateral position. Therefore, possibility of collision between the rear derailleur and an obstacle is relatively low. Additionally, the bicycle rear derailleur is more stable.

In accordance with a sixth aspect of the present invention, the bicycle rear derailleur according to any of the first to fifth aspects is configured so that the derailleur linear distance is equal to or smaller than one hundred millimeters.

With the bicycle rear derailleur according to the sixth aspect, it is possible for the bicycle rear derailleur to fit to a wide range bicycle rear sprocket assembly. Additionally, the rear derailleur protrudes less from the bicycle frame because the first pulley plane intersects the first link member while the chain guide is located at the second lateral position. Therefore, possibility of collision between the rear derailleur and an obstacle is relatively low.

In accordance with a seventh aspect of the present invention, the bicycle rear derailleur according to any of the first to sixth aspects is configured so that the first lateral position corresponds to a largest sprocket of a rear sprocket assembly of the bicycle in a state where the bicycle rear derailleur is mounted to the bicycle frame of the bicycle.

With the bicycle rear derailleur according to the seventh aspect, it is possible for the bicycle rear derailleur to fit to a wide range bicycle rear sprocket assembly. Additionally, the rear derailleur protrudes less from the bicycle frame because the first pulley plane intersects the first link member while the chain guide is located at the second lateral position. Therefore, possibility of collision between the rear derailleur and an obstacle is relatively low.

In accordance with an eighth aspect of the present invention, the bicycle rear derailleur according to any of the first to seventh aspects is configured so that the second lateral position corresponds to a smallest sprocket of a rear sprocket assembly of the bicycle in a state where the bicycle rear derailleur is mounted to the bicycle frame of the bicycle.

With the bicycle rear derailleur according to the eighth aspect, it is possible for the bicycle rear derailleur to fit to a wide range bicycle rear sprocket assembly. Additionally, the rear derailleur protrudes less from the bicycle frame because the first pulley plane intersects the first link member while the chain guide is located at the second lateral position. Therefore, possibility of collision between the rear derailleur and an obstacle is relatively low.

In accordance with a ninth aspect of the present invention, the bicycle rear derailleur according to any of the first to eighth aspects further comprises a second link member movably coupled between the base member and the movable member to laterally move the chain guide relative to the base member between the first lateral position and the second lateral position. The second link member is disposed laterally outward from the first link member.

With the bicycle rear derailleur according to the ninth aspect, it is possible for the bicycle rear derailleur to fit to a wide range bicycle rear sprocket assembly. Additionally, the rear derailleur protrudes less from the bicycle frame because the first pulley plane intersects the first link member while the chain guide is located at the second lateral position. Therefore, possibility of collision between the rear derailleur and an obstacle is relatively low.

In accordance with a tenth aspect of the present invention, the bicycle rear derailleur according to any of the first to ninth aspects is configured so that the chain guide further includes a second pulley rotatably arranged around a second pulley axis in a second pulley plane. The first pulley axis and the second pulley axis are offset from the pivot axis.

With the bicycle rear derailleur according to the tenth aspect, it is possible for the bicycle rear derailleur to fit to a wide range bicycle rear sprocket assembly. Additionally, the rear derailleur protrudes less from the bicycle frame because the first pulley plane intersects the first link member while the chain guide is located at the second lateral position. Therefore, possibility of collision between the rear derailleur and an obstacle is relatively low.

In accordance with an eleventh aspect of the present invention, the bicycle rear derailleur according to the tenth aspect is configured so that the second pulley plane intersects with the first pulley plane.

With the bicycle rear derailleur according to the eleventh aspect, it is possible for the bicycle rear derailleur to fit to a wide range bicycle rear sprocket assembly. Additionally, the rear derailleur protrudes less from the bicycle frame because the first pulley plane intersects the first link member while the chain guide is located at the second lateral position. Therefore, possibility of collision between the rear derailleur and an obstacle is relatively low.

In accordance with a twelfth aspect of the present invention, the bicycle rear derailleur according to any of the first to eleventh aspects is configured so that the first link member includes a main body portion disposed between the base member and the movable member and an extended portion extending from the main body portion. The first pulley plane intersects the extended portion of the first link member in a state where the chain guide is located at the second lateral position.

With the bicycle rear derailleur according to the twelfth aspect, it is possible for the bicycle rear derailleur to fit to a wide range bicycle rear sprocket assembly. Additionally, the rear derailleur protrudes less from the bicycle frame because the first pulley plane intersects the first link member while the chain guide is located at the second lateral position. Therefore, possibility of collision between the rear derailleur and an obstacle is relatively low.

In accordance with a thirteenth aspect of the present invention, the bicycle rear derailleur according to the twelfth aspect is configured so that the main body portion of the first link member has a base member side part and a movable member side part. The extended portion of the first link member extends from the base member side part.

With the bicycle rear derailleur according to the thirteenth aspect, it is possible for the bicycle rear derailleur to fit to a wide range bicycle rear sprocket assembly. Additionally, the rear derailleur protrudes less from the bicycle frame because the first pulley plane intersects the first link member while the chain guide is located at the second lateral position. Therefore, possibility of collision between the rear derailleur and an obstacle is relatively low.

In accordance with a fourteenth aspect of the present invention, the bicycle rear derailleur according to the thirteenth aspect is configured so that the first link member includes a cable attachment structure configured to attach an inner wire of a Bowden cable thereto. The cable attachment structure is disposed laterally inward of the first pulley plane towards the bicycle center plane of the bicycle frame in a state where the bicycle rear derailleur is mounted to the bicycle frame in the second lateral position. The extended portion of the first link member is provided between the cable attachment structure and the main body portion.

With the bicycle rear derailleur according to the fourteenth aspect, it is possible for the bicycle rear derailleur to fit to a wide range bicycle rear sprocket assembly. Additionally, the rear derailleur protrudes less from the bicycle frame because the first pulley plane intersects the first link member while the chain guide is located at the second lateral position. Therefore, possibility of collision between the rear derailleur and an obstacle is relatively low.

In accordance with a fifteenth aspect of the present invention, the bicycle rear derailleur according to the fourteenth aspect is configured so that the base member includes an outer casing receiving portion dimensioned to receive an outer casing of the Bowden cable.

With the bicycle rear derailleur according to the fifteenth aspect, it is possible for the bicycle rear derailleur to fit to a wide range bicycle rear sprocket assembly. Additionally, the rear derailleur protrudes less from the bicycle frame because the first pulley plane intersects the first link member while the chain guide is located at the second lateral position. Therefore, possibility of collision between the rear derailleur and an obstacle is relatively low.

In accordance with a sixteenth aspect of the present invention, the bicycle rear derailleur according to any of the first to the fifteenth aspects further comprises a biasing member that biases the movable member and the chain guide towards the second lateral position.

With the bicycle rear derailleur according to the sixteenth aspect, it is possible for the bicycle rear derailleur to fit to a wide range bicycle rear sprocket assembly. Additionally, the rear derailleur protrudes less from the bicycle frame because the first pulley plane intersects the first link member while the chain guide is located at the second lateral position. Therefore, possibility of collision between the rear derailleur and an obstacle is relatively low.

In accordance with a seventeenth aspect of the present invention, a bicycle rear shift system is provided that comprises the bicycle rear derailleur according to any of the first to sixteenth aspects and further comprises a rear sprocket assembly having a largest sprocket corresponding to the first lateral position and a smallest sprocket corresponding to the second lateral position. A total tooth number of the largest sprocket is larger than thirty-six. A total tooth number of the smallest sprocket is equal to or smaller than eleven.

With the bicycle rear shift system according to the seventeenth aspect, it is possible for the bicycle rear derailleur to fit to a wide range bicycle rear sprocket assembly. Additionally, the rear derailleur protrudes less from the bicycle frame because the first pulley plane intersects the first link member while the chain guide is located at the second lateral position. Therefore, possibility of collision between the rear derailleur and an obstacle is relatively low.

Also other objects, features, aspects and advantages of the disclosed bicycle rear derailleur will become apparent to those skilled in the art from the following detailed description, which, taken in conjunction with the annexed drawings, discloses one embodiment of the bicycle rear derailleur.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
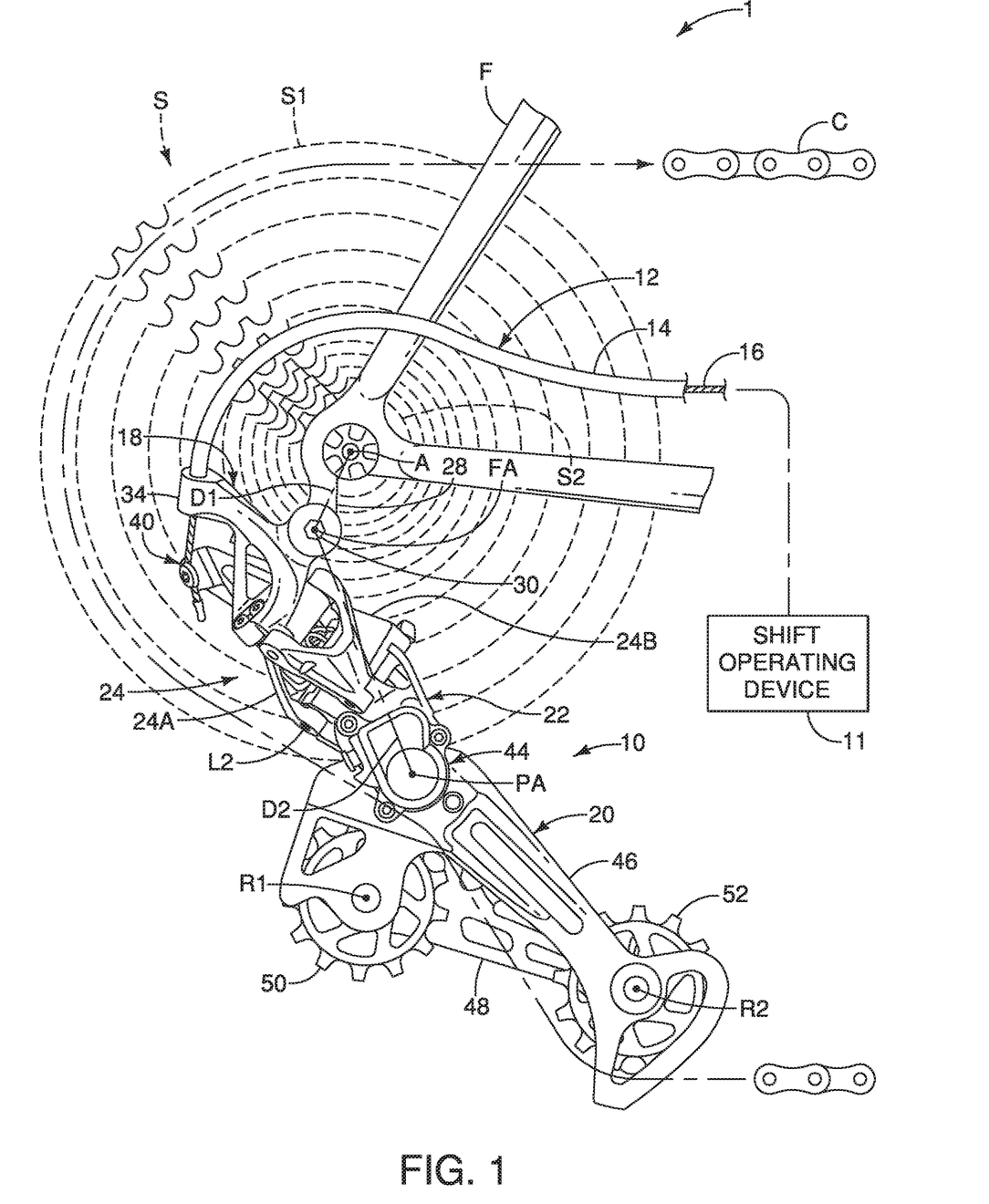
FIG. 1 is a side elevational view of a rear portion of a bicycle that is equipped with a rear sprocket assembly and a bicycle rear derailleur that is in a low shift stage position in accordance with one illustrated embodiment.

Referring initially to FIG. 1, a bicycle rear shift system 1 is illustrated in accordance with one illustrated embodiment. The bicycle rear shift system 1 includes a bicycle rear derailleur 10. As shown, a rear portion of a bicycle frame F is illustrated as being equipped with the bicycle rear derailleur 10. The bicycle frame F rotatably supports a rear wheel (not shown). The bicycle rear derailleur 10 is operatively coupled to a shift operating device 11 via a Bowden cable 12 in a conventional manner. The Bowden cable 12 is a control cable that includes an outer casing 14 and an inner wire 16. The inner wire 16 is operable by the shift operating device 11 to shift the bicycle rear derailleur 10 between shift stage positions via operation of the shift operating device 11.

The bicycle rear shift system 1 further comprises a rear sprocket assembly S. The rear sprocket assembly S includes a plurality of rear sprockets that are mounted on a sprocket supporting member (not shown) of a bicycle rear wheel in a conventional manner to transmit drive torque to a bicycle rear hub body of the bicycle rear wheel (not shown). Here, the rear sprocket assembly S has twelve rear sprockets. The rear sprockets are arranged coaxial with a rotational center axis A of the bicycle rear hub body. The rear sprocket assembly S has a largest sprocket S1. In the illustrated embodiment, a total tooth number of the largest sprocket S1 is larger than thirty-six. Further, as shown, the rear sprocket assembly S has a smallest sprocket S2. In the illustrated embodiment, a total tooth number of the smallest sprocket S2 is equal to or smaller than eleven. The bicycle rear derailleur 10 is configured to shift a bicycle chain C between the rear sprockets of the rear sprocket assembly S, as will be further discussed below. The rear sprocket assembly S is conventional, and thus, the rear sprocket assembly S will not be further discussed in detail herein.

Figure 2:
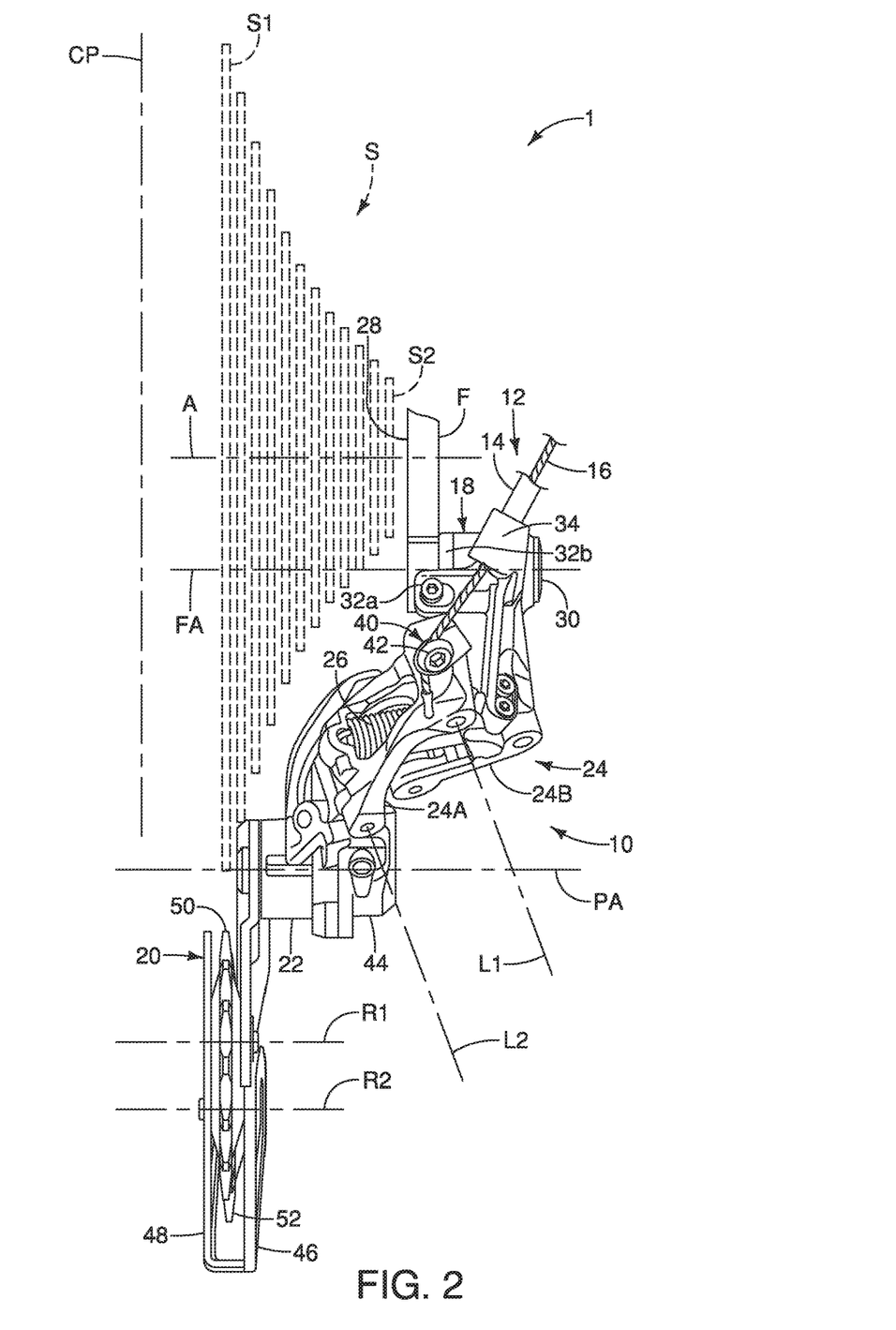
FIG. 2 is a rear elevational view of the rear sprocket assembly and the bicycle rear derailleur illustrated in FIG. 1.
Figure 3:
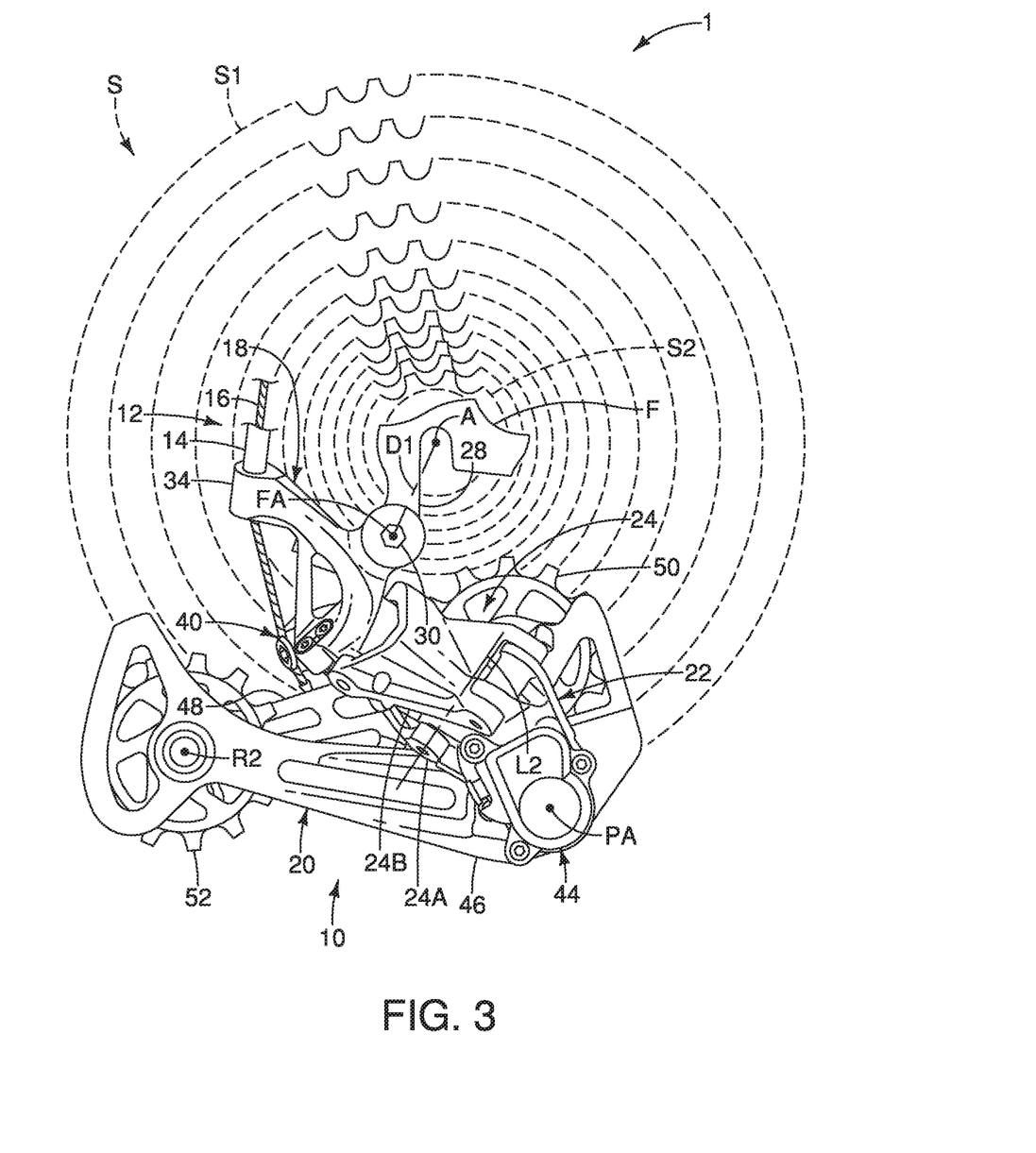
FIG. 3 is a side elevational view of the rear sprocket assembly and the bicycle rear derailleur illustrated in FIGS. 1 and 2 with bicycle rear derailleur in a top shift stage position.
Figure 4:
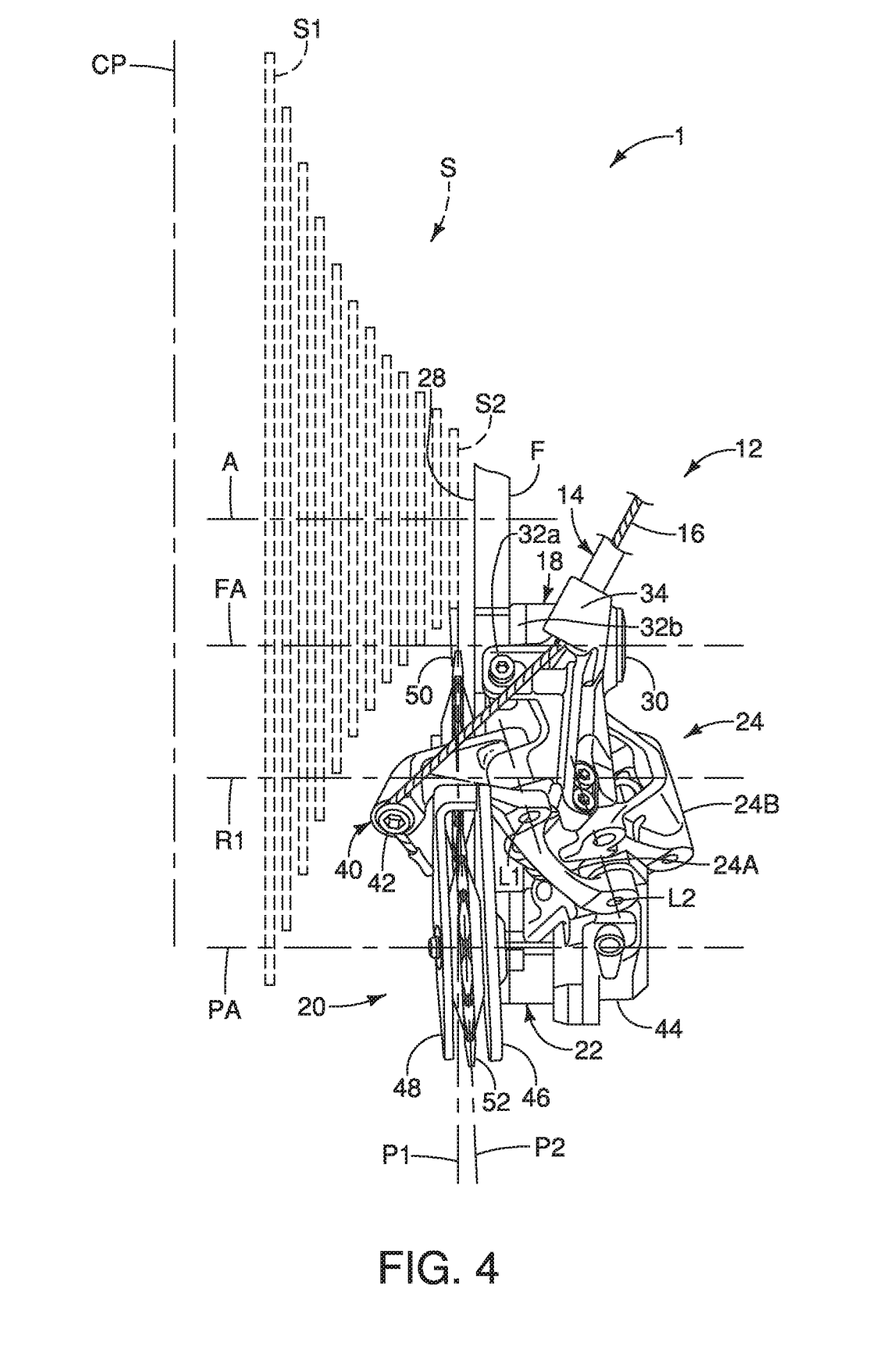
FIG. 4 is a rear elevational view of the rear sprocket assembly and the bicycle rear derailleur illustrated in FIGS. 1 to 3 with the bicycle rear derailleur in the top shift stage position.

The bicycle rear derailleur 10 comprises a base member 18, a chain guide 20 and a movable member 22. As will be further discussed below, the movable member 22 pivotally supports the chain guide 20 about a pivot axis PA. The bicycle rear derailleur 10 further comprises a linkage assembly 24 that movably couples the movable member 22 to the base member 18. Here, the linkage assembly 24 of the bicycle rear derailleur 10 comprises a first link member 24A. More preferably, the linkage assembly 24 of the bicycle rear derailleur 10 further comprises a second link member 24B. The movable member 22, the linkage assembly 24 and the chain guide 20 are configured to move relative to the base member 18 to shift the bicycle chain C between the rear sprockets of the rear sprocket assembly S. In particular, the first link member 24A is movably coupled between the base member 18 and the movable member 22 to laterally move the chain guide 20 relative to the base member 18 between a first lateral position (FIGS. 1, 2 and 5) and a second lateral position (FIGS. 3 and 4). Likewise, the second link member 24B is movably coupled between the base member 18 and the movable member 22 to laterally move the chain guide 20 relative to the base member 18 between the first lateral position (FIGS. 1, 2 and 5) and the second lateral position (FIGS. 3 and 4).

In the illustrated embodiment, the first lateral position corresponds to a low shift (gear) stage position and the second lateral position corresponds to a top shift (gear) stage position. As shown in FIGS. 2 and 4, the first lateral position (FIG. 2) is closer to a bicycle center plane CP of the bicycle frame F than the second lateral position (FIG. 4) in a state where the bicycle rear derailleur 10 is mounted to the bicycle frame F. Thus, as used herein, the term "low shift (gear) stage position" refers to the bicycle rear derailleur 10 being in an operating position that corresponds to the bicycle chain C being guided onto the largest sprocket S1 that is located closest to the bicycle, center plane CP of the bicycle frame F. As seen in FIGS. 1 and 2, the first lateral position corresponds to the largest sprocket S1 of the rear sprocket assembly S of the bicycle in a state where the bicycle rear derailleur 10 is mounted to the bicycle frame F of the bicycle. As used herein, the term "top shift (gear) stage position" refers to the rear derailleur 10 being in an operating position that corresponds to the bicycle chain C being guided to the smallest sprocket S2 that is located farthest away from the bicycle center plane CP of the bicycle frame F. Thus, as seen in FIGS. 3 and 4, the second lateral position corresponds to the smallest sprocket S2 of the rear sprocket assembly S of the bicycle in a state where the bicycle rear derailleur 10 is mounted to the bicycle frame F of the bicycle. In other words, the largest sprocket S1 corresponds to the first lateral position and the smallest sprocket S2 corresponds to the second lateral position.

Referring to FIG. 2, the bicycle rear derailleur 10 further comprises a biasing member 26 that biases the movable member 22 and the chain guide 20 towards the second lateral position. In particular, the biasing member 26 is interposed between the first and second link members 24A and 24B to bias the movable member 22 and the chain guide 20 toward the top shift stage position. Here, for example, the biasing member 26 is a coil tension spring interposed between the first and second link members 24A and 24B to bias the movable member 22 and the chain guide 20 toward the top shift stage position.

Figure 7:
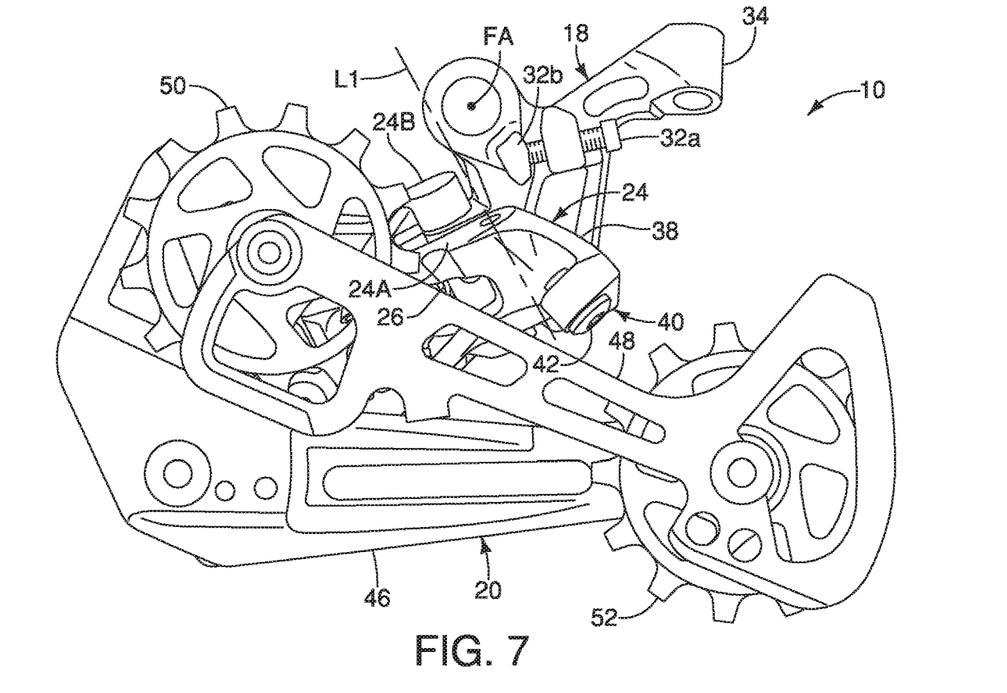
FIG. 7 is a frame facing side elevational view of the bicycle rear derailleur illustrated in FIGS. 1 to 6 in the top shift stage position.

The base member 18 will now be discussed. The base member 18 is a rigid member made of a suitable material such as a metallic material or a fiber reinforced plastic material. Preferably, the base member 18 is integrally formed as a one-piece, unitary member. The base member 18 is configured to be mounted to the bicycle frame F at a frame mounting axis FA. In particular, the base member 18 is configured to be releasably mounted to the bicycle frame F. The base member 18 is directly mounted to a hanger portion 28 of the bicycle frame F via a mounting bolt 30 that forms a B-axle. The mounting bolt 30 forms the frame mounting axis FA that is a single mounting axis of the bicycle rear derailleur 10. Thus, the base member 18 is configured to be mounted to the bicycle frame F of the bicycle at the single frame mounting axis FA. In other words, in the bicycle rear derailleur 10, there is only the single frame mounting axis FA. Thus, the bicycle rear derailleur 10 does not utilize a bracket axle unit, which has two B-axle axes, During adjustment of the bicycle rear derailleur 10, the user adjusts the orientation of the bicycle rear derailleur 10 with respect to the bicycle frame F via a screw 32a and a stopper plate 32b shown in FIGS. 7 and 8. The stopper plate 32b has an abutment that contacts the hanger portion 28 of the bicycle frame F. The screw 32a is threaded into a threaded hole of the base member 18, and oriented to contact and move the stopper plate 32b about the single frame mounting axis FA for adjusting the orientation of the base member 18 with respect to the stopper plate 32b. In this way, a posture of the bicycle rear derailleur 10 with respect to the bicycle frame F is adjustable about the single frame mounting axis FA.

Figure 5:
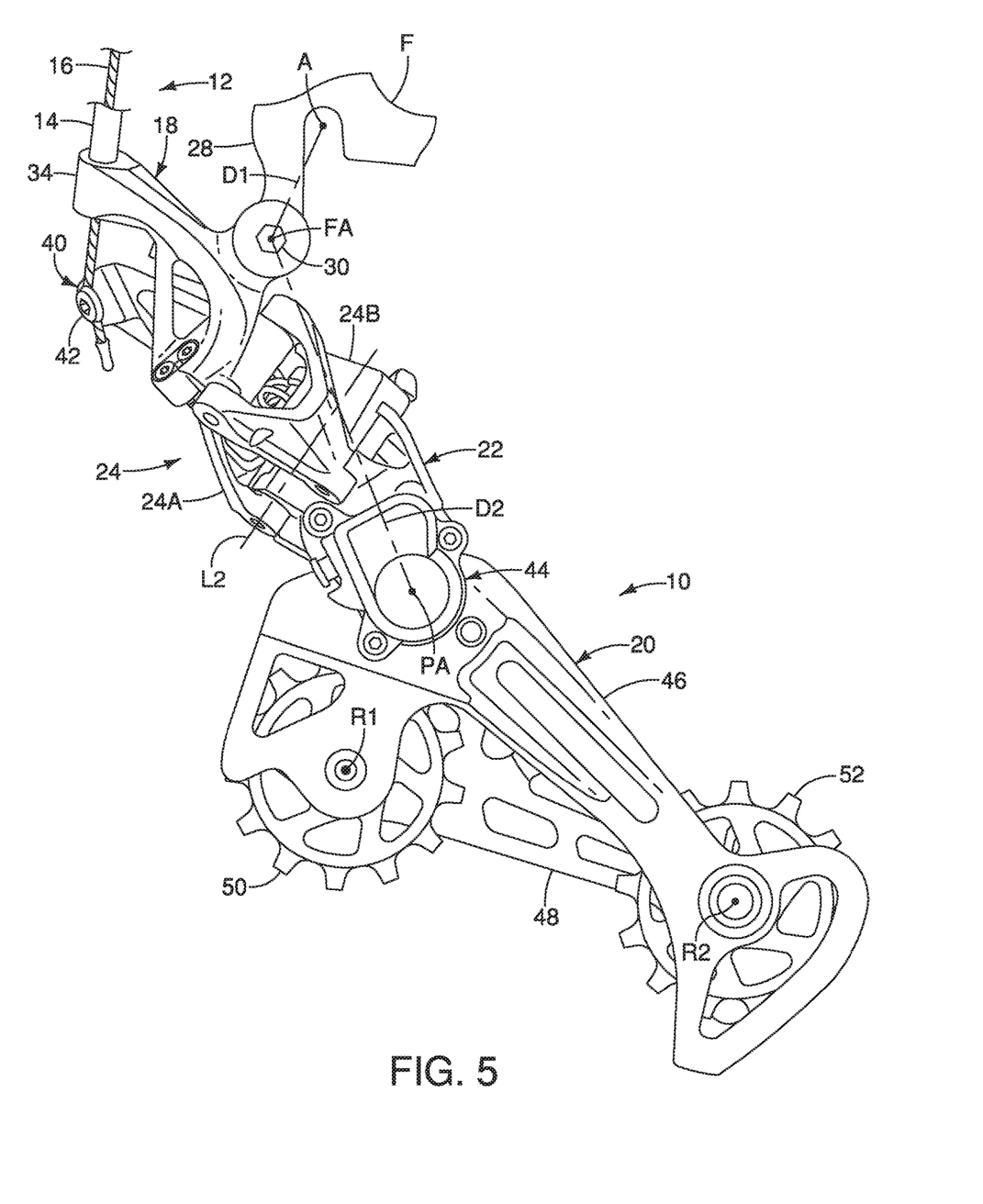
FIG. 5 is an enlarged view of the bicycle rear derailleur illustrated in FIGS. 1 to 4 in the low shift stage position.

In the illustrated embodiment, as best seen in FIGS. 1, 3 and 5, the single frame mounting axis FA is spaced from the hub axis A of the bicycle by a frame linear distance D1 that is equal to or smaller than forty-two millimeters. Preferably, the frame linear distance D1 is equal to or larger than twenty millimeters. As mentioned above, a conventional direct mount type rear derailleur can only be mounted onto direct-mount compatible bicycle frames. Thus, a conventional direct mount type rear derailleur is dimensioned to be compatible with direct-mount compatible bicycle frames. Typically, a conventional direct mount type rear derailleur will have a minimum frame linear distance between a hub axis and a frame mounting axis that is approximately 42.22 millimeters. On the other hand, as mentioned above, a conventional non-direct mount type rear derailleur is typically mounted to a bicycle frame via a bracket axle unit and a mounting bolt, resulting in two B-axes that are mounting axes, Thus, the bicycle rear derailleur 10 of the illustrated embodiment utilizes a fewer number of components than a conventional non-direct mount type rear derailleur as it does not utilize the bracket axle unit. Additionally, with a typical conventional non-direct mount type rear derailleur, the non-direct mount type rear derailleur will have a minimum frame linear distance between the hub axis and the frame mounting axis that is twenty-four millimeters.

Also, as best seen in FIGS. 1, 3 and 5, the frame mounting axis FA is spaced from the pivot axis PA by a derailleur linear distance D2 that is equal to or larger than eighty-nine millimeters in a state where the chain guide 20 is positioned at the first lateral position. In other words, the derailleur linear distance D2 is equal to or larger than eighty-nine millimeters when the chain guide 20 is at the low gear stage position. Preferably, the single frame mounting axis FA is spaced from the pivot axis PA by the derailleur linear distance D2 that is equal to or larger than seventy-eight millimeters in a state where the chain guide 20 is positioned at the first lateral position. In other words, the derailleur linear distance D2 is preferably equal to or larger than seventy-eight millimeters when the chain guide 20 is at the low gear stage position. More preferably, the derailleur linear distance D2 is equal to or smaller than one hundred millimeters when the chain guide 20 is positioned at the low gear stage position.

As shown, the base member 18 further includes an outer casing receiving portion 34 dimensioned to receive the outer casing 14 of the Bowden cable 12. The outer casing receiving portion 34 supports one end of the outer casing 14 of the Bowden cable 12.

The linkage assembly 24 will now be discussed. As stated above, the linkage assembly 24 includes the first link member 24A and the second link member 24B. In the illustrated embodiment, the first link member 24A is an inner link of the linkage assembly 24 and the second link member 24B is an outer link of the linkage assembly 24. As shown, the base member 18, the movable member 22, the first and second link members 24A and 24B form a four-bar linkage arranged to move the chain guide 20 laterally between a plurality of shift stage positions (e.g., at least the first lateral position and the second lateral position) conventional manner.

Figure 6:
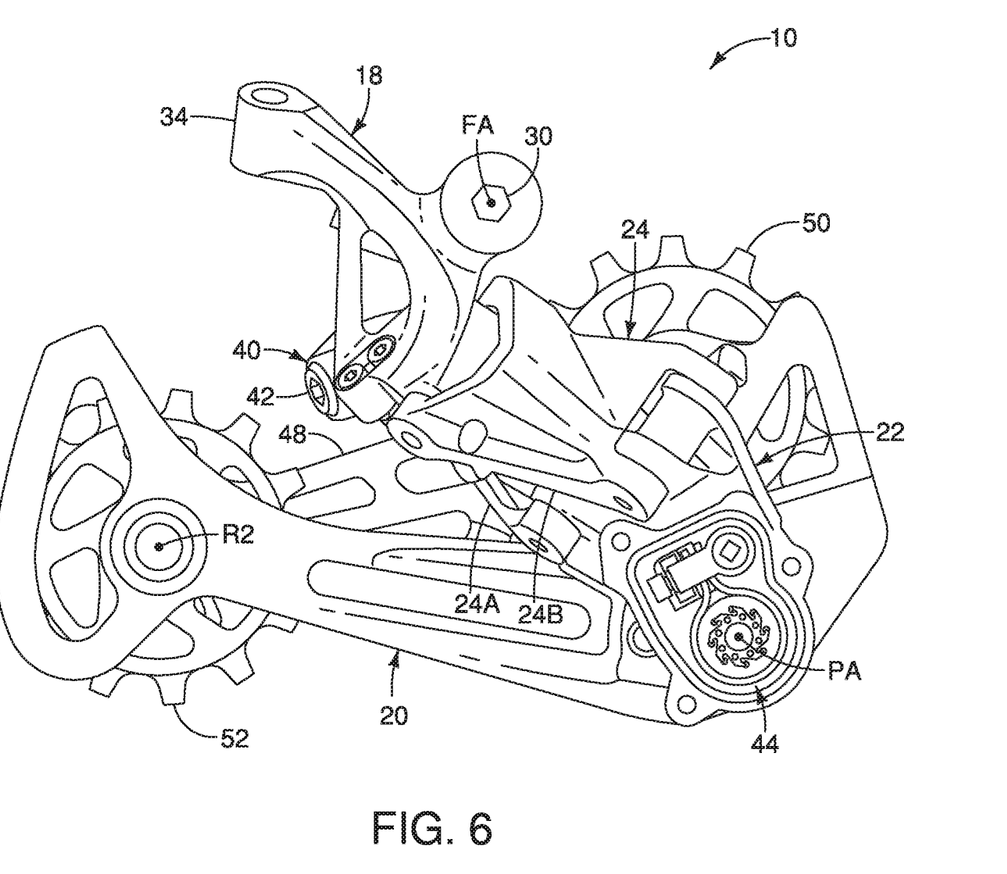
FIG. 6 is an outer side elevational view of the bicycle rear derailleur illustrated in FIGS. 1 to 5 in the top shift stage position.
Figure 8:
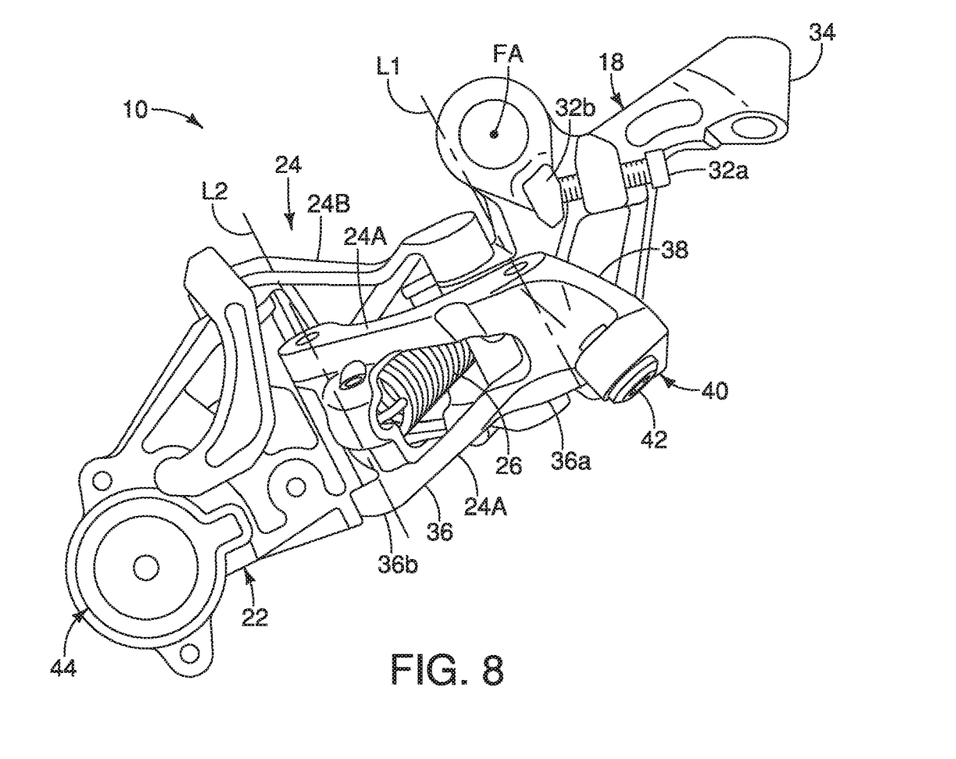
FIG. 8 is a frame facing side elevational view of the bicycle rear derailleur illustrated in FIGS. 1 to 7 in the top shift stage position, with the chain guide removed.

As best seen in FIGS. 4 and 6, the first link member 24A is pivotally coupled to the base member 18 at a first link axis L1. The first link member 24A is pivotally coupled to the movable member 22 at a second link axis L2. The first link axis L1 and the second link axis L2 are more vertical than horizontal with respect to the pivot axis PA in a state where the bicycle rear derailleur 10 is mounted to the bicycle frame F and as viewed from a rear side of the bicycle, as shown in FIG. 2. As shown, the frame mounting axis FA is disposed at the base member 18 without another frame mounting axis FA between the frame mounting axis FA and the first link axis L1. In other words, the rear derailleur 10 only includes the single frame mounting axis FA that is a frame mounting axis. As best seen in FIG. 8, the first link member 24A includes a main body portion 36 disposed between the base member 18 and the movable member 22. The first link member 24A further includes an extended portion 38 extending from the main body portion 36.

As seen in FIG. 8, the main body portion 36 of the first link member 24A has a base member side part 36*a* and a movable member side part 36*b*. The extended portion 38 of the first link member 24A extends from the base member side part 36*a*. The first link member 24A further includes a cable attachment structure 40 configured to attach the inner wire 16 of the Bowden cable 12 thereto. The inner wire 16 of the Bowden cable 12 is adjustably attached to the cable attachment structure 40 via a bolt 42 that is threaded into a threaded hole of the cable attachment structure 40. As shown, the extended portion 38 of the first link member 24A is provided between the cable attachment structure 40 and the main body portion 36.

The second link member 24B is movably coupled between the base member 18 and the movable member 22. Similar to the first link member 24A, the second link member 24B laterally moves the chain guide 20 relative to the base member 18 between the first lateral position (FIGS. 1, 2 and 5) and the second lateral position (FIGS. 3 and 4). As previously stated, the second link member 24B is an outer link of the linkage assembly 24. Thus, the second link member 24B is disposed laterally outward from the first link member 24A.

The movable member 22 will now be discussed primarily with reference to FIG. 6. The movable member 22 is movably coupled to the base member 18. The movable member 22 is movably connected to the base member 18 by the linkage assembly 24. In other words, the chain guide 20 is pivotally mounted to the movable member 22 so that the chain guide 20 can pivot about the pivot axis PA. The movable member 22 is a rigid member made of a suitable material such as a metallic material or a fiber reinforced plastic material.

In the illustrated embodiment, the bicycle rear derailleur 10 is provided with a resistance applying mechanism 44 to help prevent chain bounce and maintain the desired chain tension of the bicycle chain C during riding. In particular, the movable member 22 includes the resistance applying mechanism 44 that applies resistance to a rotational movement of the chain guide 20. The resistance applying mechanism 44 is provided such that when the chain guide 20 rotates in a predetermined direction about the pivot axis PA, the resistance of the movement of the chain guide 20 in the predetermined direction is increased. In the illustrated embodiment, the predetermined direction corresponds to a counterclockwise direction about the pivot axis PA as viewed from a non-frame facing side of the bicycle rear derailleur 10. The chain guide 20 is biased in the clockwise direction about the pivot axis PA as viewed from the non-frame facing side of the bicycle rear derailleur 10. The resistance applying mechanism 44 applies resistance in the counterclockwise direction.

The resistance applying mechanism 44 can be a friction unit. The resistance applying mechanism 44 preferably includes a one-way clutch and a friction applying element. The one-way clutch applies resistance to rotational movement of the chain guide 20 in the predetermined direction. The friction applying element applies frictional resistance to rotational movement of the chain guide 20 by applying frictional resistance to the rotation of the one-way clutch, Basically, the resistance applying mechanism 44 only applies a frictional resistance to the rotation of the chain guide 20 via the one-way clutch when the chain guide 20 pivots in the counterclockwise direction. The one-way clutch disconnects the resistance applying mechanism 44 when the chain guide 20 pivots in the clockwise direction. A protective cover is mounted to a resistance applying mechanism mounting flange of the movable member 22 through fasteners to protect components of the resistance applying mechanism 44. The resistance applying mechanism 44 includes a friction switch lever and an adjustment screw. Preferably, the frictional resistance (that is, rotational resistance) applied by the resistance applying mechanism 44 is adjustable. By operating the friction switch lever and/or adjusting the adjustment screw, the user can adjust a degree of frictional resistance applied by the resistance applying mechanism 44 to the chain guide 20. Basically, the friction switch lever acts as an ON/OFF switch, while the adjustment screw provides a fine adjustment of the level of frictional resistance. The friction switch lever is movable between a first position (an ON position) in which frictional resistance is applied to the chain guide 20, and a second position (an OFF position) in which substantially zero frictional resistance is applied to the chain guide 20.

Alternatively, the resistance applying mechanism 44 can be an oil damper to apply resistance to a rotational movement of the chain guide 20. In the illustrated embodiment, the resistance applying mechanism 44 is illustrated as a friction applying unit.

The chain guide 20 will now be discussed with reference to FIGS. 2, 4, 7 and 8. The chain guide 20 basically includes a first (outer) chain cage plate 46 and second (inner) chain cage plate 48. The first and second chain cage plates 46 and 48 define a chain receiving slot for receiving the bicycle chain C. The chain guide 20 is rotatably coupled to the movable member 22 at the pivot axis PA.

As best seen in FIGS. 2 and 4, the chain guide 20 includes a first pulley 50 rotatably arranged around a first pulley axis R1 in a first pulley plane P1. The first pulley 50 is a guide pulley. The chain guide 20 further includes a second pulley 52 rotatably arranged around a second pulley axis R2 in a second pulley plane P2. The second pulley 52 is a tension pulley. The first and second pulleys 50 and 52 are both rotatably disposed between the first and second chain cage plates 46 and 48. As shown in FIG. 2, the first pulley axis R1 and the second pulley axis R2 are offset from the pivot axis PA. As shown in FIG. 4, the second pulley plane P2 intersects with the first pulley plane P1. In other words, in the illustrated embodiment, the second pulley plane P2 and the first pulley plane P1 do not coincide. Thus, the second pulley plane P2 and the first pulley plane P1 are offset. Also, as shown, the first pulley plane P1 intersects the extended portion 38 of the first link member 24A in a state where the chain guide 20 is located at the second lateral position. As seen in FIG. 4, the cable attachment structure 40 is disposed laterally inward of the first pulley plane P1 towards the bicycle center plane CP of the bicycle frame F in a state where the bicycle rear derailleur 10 is mounted to the bicycle frame F in the second lateral position.

In understanding the scope of the present invention, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle rear derailleur. Accordingly, these directional terms, as utilized to describe the bicycle rear derailleur should be interpreted relative to a bicycle in an upright riding position on a horizontal surface and that is equipped with the bicycle rear derailleur. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element, and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle rear derailleur comprising:
a base member configured to be mounted to a bicycle frame of a bicycle at a single frame mounting axis such that a posture of the bicycle rear derailleur with respect to the bicycle frame is adjustable about the single frame mounting axis, the single frame mounting axis being spaced from a hub axis of the bicycle by a frame linear distance that is equal to or smaller than forty-two millimeters;
a chain guide including a first pulley rotatably arranged around a first pulley axis in a first pulley plane;
a movable member pivotally supporting the chain guide about a pivot axis, the movable member including a resistance applying mechanism applying resistance to a rotational movement of the chain guide; and
a first link member movably coupled to the base member at a first link axis and movably coupled to the movable member at a second link axis to laterally move the chain guide relative to the base member between a first lateral position and a second lateral position, the first lateral position being closer to a bicycle center plane of the bicycle frame than the second lateral position in a state where the bicycle rear derailleur is mounted to the bicycle frame, the first link axis and the second link axis being more vertical than horizontal with respect to the pivot axis in a state where the bicycle rear derailleur is mounted to the bicycle frame and as viewed from a rear side of the bicycle, the first pulley plane intersecting the first link member in a state where the chain guide is located at the second lateral position, the single frame mounting axis being spaced from the pivot axis by a derailleur linear distance that is equal to or smaller than one hundred millimeters in a state where the chain guide is positioned at the first lateral position.

2. The bicycle rear derailleur according to claim 1, wherein
the movable member includes a resistance applying mechanism applying resistance to a rotational movement of the chain guide.

3. The bicycle rear derailleur according to claim 1, wherein
the frame linear distance is equal to or larger than twenty millimeters.

4. The bicycle rear derailleur according to claim 1, wherein
the first lateral position corresponds to a largest sprocket of a rear sprocket assembly of the bicycle in a state where the bicycle rear derailleur is mounted to the bicycle frame of the bicycle.

5. The bicycle rear derailleur according to claim 1, wherein
the second lateral position corresponds to a smallest sprocket of a rear sprocket assembly of the bicycle in a state where the bicycle rear derailleur is mounted to the bicycle frame of the bicycle.

6. The bicycle rear derailleur according to claim 1, further comprising
a second link member movably coupled between the base member and the movable member to laterally move the chain guide relative to the base member between the first lateral position and the second lateral position, the second link member being disposed laterally outward from the first link member.

7. The bicycle rear derailleur according to claim 1, wherein
the chain guide further includes a second pulley rotatably arranged around a second pulley axis in a second pulley plane, the first pulley axis and the second pulley axis are offset from the pivot axis.

8. The bicycle rear derailleur according to claim 7, wherein
the second pulley plane intersects with the first pulley plane.

9. The bicycle rear derailleur according to claim 1, wherein
the first link member includes a main body portion disposed between the base member and the movable member and an extended portion extending from the main body portion, and
the first pulley plane intersects the extended portion of the first link member in a state where the chain guide is located at the second lateral position.

10. The bicycle rear derailleur according to claim 9, wherein
the main body portion of the first link member has a base member side part and a movable member side part, and
the extended portion of the first link member extends from the base member side part.

11. The bicycle rear derailleur according to claim 10, wherein
the first link member includes a cable attachment structure configured to attach an inner wire of a Bowden cable thereto, the cable attachment structure is disposed laterally inward of the first pulley plane towards the bicycle center plane of the bicycle frame in a state where the bicycle rear derailleur is mounted to the bicycle frame in the second lateral position, and
the extended portion of the first link member is provided between the cable attachment structure and the main body portion.

12. The bicycle rear derailleur according to claim 11, wherein
the base member includes an outer casing receiving portion dimensioned to receive an outer casing of the Bowden cable.

13. The bicycle rear derailleur according to claim 1, further comprising
a biasing member that biases the movable member and the chain guide towards the second lateral position.

14. A bicycle rear shift system including the bicycle rear derailleur according to claim 1, and further comprising:
a rear sprocket assembly having a largest sprocket corresponding to the first lateral position and a smallest sprocket corresponding to the second lateral position, a total tooth number of the largest sprocket is larger than thirty-six, a total tooth number of the smallest sprocket is equal to or smaller than eleven.

* * * * *